March 17, 1970    A. G. SANGSTER ET AL    3,500,692
CABLE ACTUATED DEVICE CONVERTING ROTARY TO LINEAR MOTION
Filed July 25, 1968

Inventors
Arlon G. Sangster
Howard W. Parker
By Charles R. Fay,
Attorney

United States Patent Office 3,500,692
Patented Mar. 17, 1970

3,500,692
CABLE ACTUATED DEVICE CONVERTING
ROTARY TO LINEAR MOTION
Arlon G. Sangster, Sterling, and Howard W. Parker, Westboro, Mass. (both % Decitek, Inc., 15 Sagamore Road, Worcester, Mass. 01605)
Filed July 25, 1968, Ser. No. 747,597
Int. Cl. F16h 25/18
U.S. Cl. 74—89.22                                    1 Claim

ABSTRACT OF THE DISCLOSURE

A device converting rotary to linear motion including a drum, a flexible cable, the two ends of the cable being fixed to the periphery of the drum at points spaced in an axial direction, a plurality of cable winds about the drum from both ends inwardly toward the center of the drum forming a pair of cable ends extending tangentially from the center of the drum and in close condition relative to each other, said ends extending over separate pulleys and then joining in a cable run not directly associated with the drum, and means on the run for securing an object thereto for linear motion in two directions, depending on the direction of rotation of the drum.

Background of the invention

In the art of selecting coordinates as for instance, pre-determined points on abscissas and ordinates for any purpose, by moving a pointer, tool, or other object according to a pre-conceived plan, such as a tape, it is the practice to provide a rectilinearly movable support which mounts another like support moving an object at right angles to the path of the first support as by controlled racks or other gears, etc., but this requires very expensive equipment. While it is recognized that accuracy is paramount, the present invention accomplishes the purposes of such coordinate seeking devices fully as accurately as the prior art devices, and much more inexpensively, as well as providing an extremely accurate drive for transposing rotary to linear motion for other purposes.

Summary of the invention

By utilizing a precision rotary drum, with means to drive it in either direction controlled by a punched card or tape, etc., and by arranging a cable with its ends secured to the drum periphery at axially spaced points, winding the cable at both ends inwardly to the center of the drum and then extending the cable tangentially from the drum in opposite directions, in close relation, to embrace opposite pulleys, a very accurate device is provided with no tendency for inaccurate winding and unwinding of the cable due to piling up, skewed ends, etc. Thus, an object clamped to the cable on the free run thereof between the pulleys, is easily and accurately positioned anywhere and repetitively along a straight line. By duplicating the device on a carrier for the described rotary drum etc., all points along abscissas and ordinates are easily found, while at the same time, the entire device can be made very inexpensively.

Description of the invention

Figure 1:
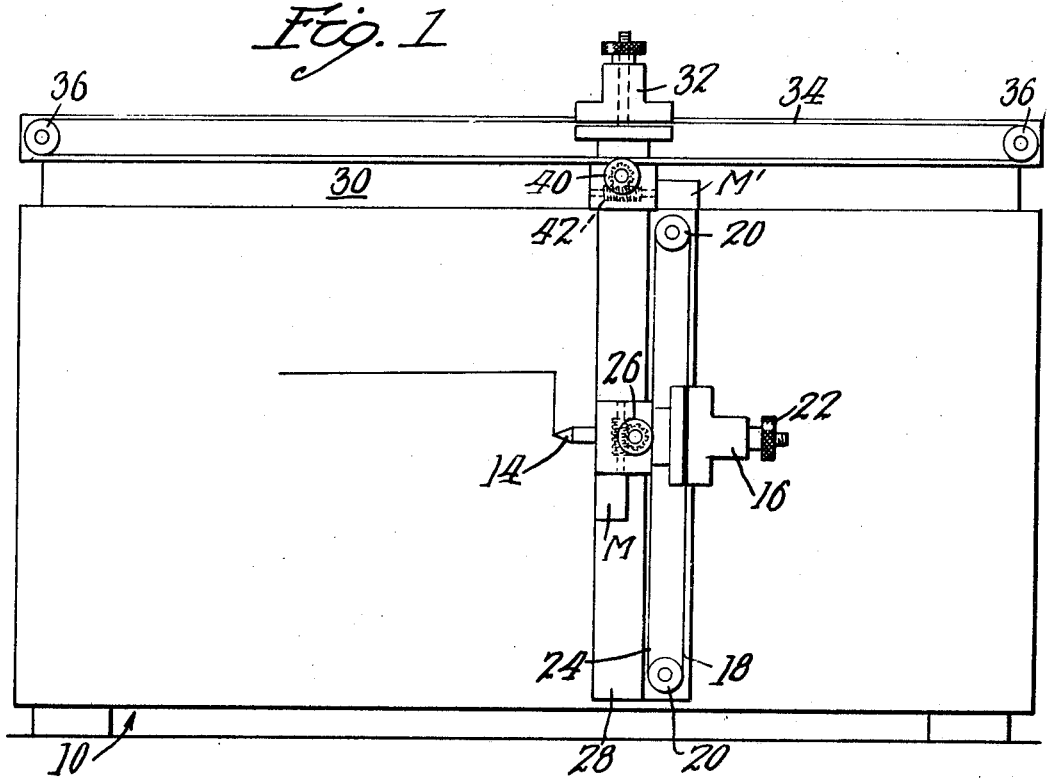
FIG. 1 is a view in elevation illustrating a form of use for the invention.

As shown in FIG. 1, a chart, table, platen or other support is indicated at 10. This support has a multitude of points to be spotted. This is done by moving pointer 14, moving to one point after another and stopping momentarily.

The support 10 may also be a machine tool platen for e.g. a drill, where a plurality of holes are to be formed in a single piece. Many other instances of the seriatim point seeking operation will occur to those skilled in the art.

The pointer, etc., 14 is mounted on a clamp 16 fastened to a free run 18 of a cable which is trained over spaced pulleys 20, 20. By means of a hand-actuated nut or other device 22, the clamp 16 may be adjusted to a preferred point on the cable run 18. The cable in the other run 24 is wrapped about a drum 26 driven by a motor M in either direction, preferably in steps. The motor can be controlled by a card or tape, etc., not shown, to move the pointer in steps along a support 28 for all the mechanism described.

In order to move the support 28 transversely to the path of pointer 14, it is in turn mounted on supporting means as at 30, and has a clamp 32 similar to that at 16, clamp 32 being adjustably secured to the run 34 of a cable trained over fixed position pulleys 36, 36. The other run 38 of this cable is wound on a drum 40, as described as to drum 26, this drum being driven in either direction by motor M', controlled as before by means not shown but well understood in the art. A worm and wheel 42 is a convenient connection between the motors and their drums.

Figure 2:
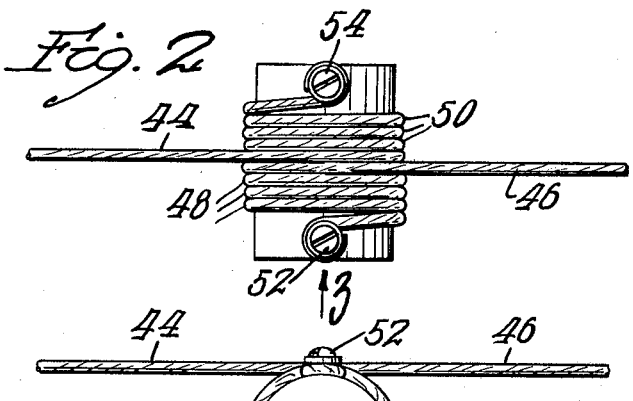
FIG. 2 is a view in elevation on an enlarged scale showing the relation of the cable to the drum.
Figure 3:
FIG. 3 is a view looking in the direction of arrow 3 in FIG. 2.

The accuracy of the motion of support 28, right to left, and clamp 16 up and down in FIG. 1 is clearly very important. This accuracy is provided by placing the portions of the cable that move onto and from the drum, in substantial juxtaposition at the center of the drum. This is shown at 44, 46, in FIG. 2. These cable ends lead onto the drum and each winds about it in close contacting winds from the center outwardly toward the ends of the drum at 48 and 50. As viewed in FIGS. 2 and 3, the winds of the cable on the drum are all in a single cylindrical plane, and as the drum is precision turned, the motion of the cable is completely even in both directions.

The terminal ends of the cable are fixed to the drum periphery at 52, 54 in spacedd relation in an axial direction sufficient to provide the correct space for the winds of the cable, and thus the pull on the cable is central of the drum. There is no skew stress on the drum which is journaled in appropriate bearings not shown, and there is no tendency to piling up of the cable turns, so that the operation is extremely smooth and accurate.

What is claimed is:

1. A device for transposing rotary motion to linear motion comprising a generally cylindrical drum adapted to be rotated, a flexible cable, the cable having two ends, means securing each of the ends to the drum in spaced relation, the cable portions adjacent the ends being wound several times on the drum periphery between the means fixing the ends of the cable to the drum, said cable extending in opposite directions from the drum, a pair of pulleys, the cable being trained over the pulleys and forming a run free of the drum, means on the free run to connect an object thereto for linear motion, and a movable support for the device and a similar drum and cable construction for moving the support, so that the object is universally movable in a single plane.

References Cited

UNITED STATES PATENTS 2,859,629  11/1958  Parker et al. _____ 74—89.22
2,987,937   6/1961  Sala _____ 74—89.22

MARK M. NEWMAN, Primary Examiner

WESLEY S. RATLIFF, Jr., Assistant Examiner